(12) United States Patent
Suzuki

(10) Patent No.: US 7,573,796 B2
(45) Date of Patent: Aug. 11, 2009

(54) INFORMATION RECORDING APPARATUS

(75) Inventor: Toshihiko Suzuki, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 584 days.

(21) Appl. No.: 11/405,397

(22) Filed: Apr. 18, 2006

(65) Prior Publication Data
US 2006/0239133 A1 Oct. 26, 2006

(30) Foreign Application Priority Data
Apr. 25, 2005 (JP) .............................. 2005-126474

(51) Int. Cl.
*G11B 27/36* (2006.01)
(52) U.S. Cl. ............... 369/53.37; 369/30.27; 369/47.33
(58) Field of Classification Search ........................ None
See application file for complete search history.

(56) References Cited
U.S. PATENT DOCUMENTS

| | | | |
|---|---|---|---|
| 5,124,963 A * | 6/1992 | Ando ........................ 369/30.09 |
| 5,132,173 A | 7/1992 | Hashimoto et al. ........... 428/336 |
| 5,315,600 A | 5/1994 | Iwamura et al. ............. 371/37.6 |
| 5,517,471 A | 5/1996 | Ashinuma et al. .............. 369/13 |
| 5,640,378 A * | 6/1997 | Arai et al. ................ 369/47.33 |
| 5,946,277 A * | 8/1999 | Kuroda et al. ............. 369/30.05 |
| 6,839,499 B1 * | 1/2005 | Lee .............................. 386/46 |
| 7,020,049 B2 | 3/2006 | Suzuki et al. ............. 369/13.26 |
| 2006/0087944 A1* | 4/2006 | Uemura et al. .............. 369/53.2 |

FOREIGN PATENT DOCUMENTS

| JP | 5-205270 | 8/1993 |
|---|---|---|
| JP | 2005-126474 | 5/2005 |

* cited by examiner

*Primary Examiner*—Thang V Tran
(74) *Attorney, Agent, or Firm*—Fitzpatrick, Cella, Harper and Scinto

(57) ABSTRACT

Provided is an information recording apparatus including: a memory for storing image pickup data; a recording circuit for intermittently recording the image pickup data stored in the memory on a disc-like medium from the memory; a setting circuit for setting an ejection mode of the disc-like medium; and a control circuit for ejecting the disc-like medium without recording the image pickup data stored in the memory on the disc-like medium when a first ejection mode is set by the setting circuit. The apparatus enables to immediately remove a disk-like medium.

2 Claims, 7 Drawing Sheets

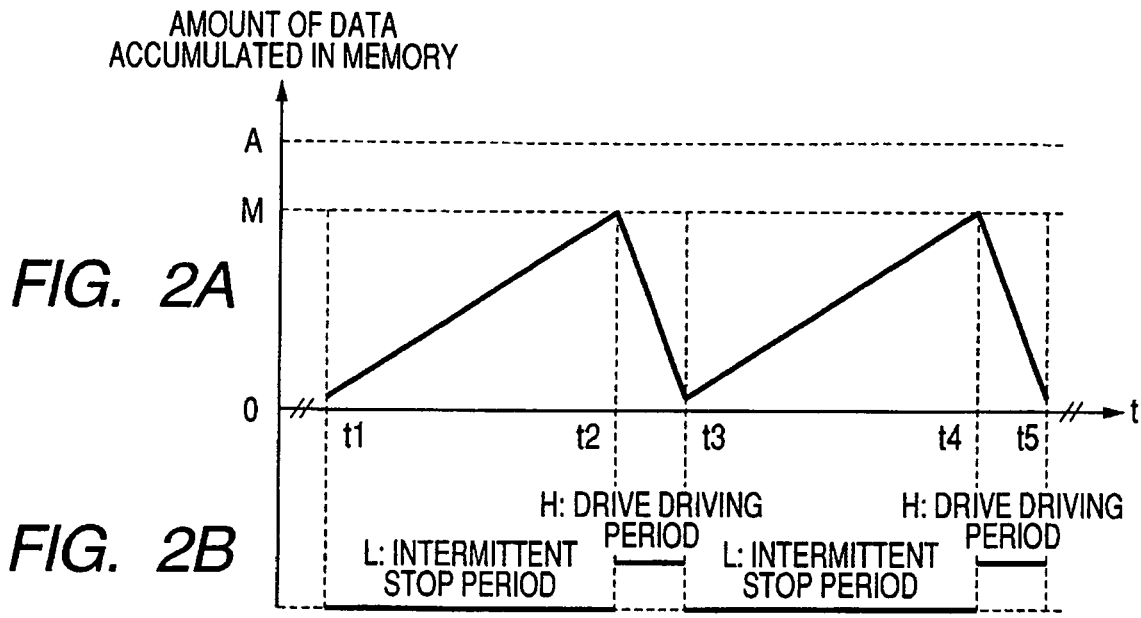
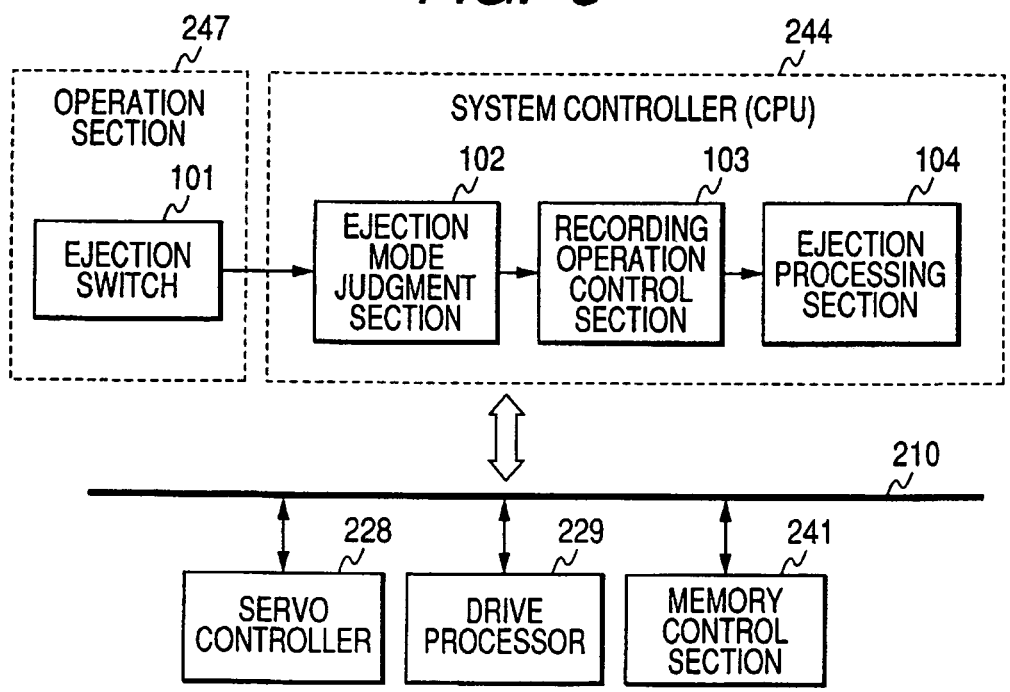

INFORMATION RECORDING APPARATUS

BACKGROUND OF THE INVENTION

1. Field of the Invention

The present invention relates to an information recording apparatus for recording information on a disc-like recording medium, in particular, to controlling ejection of a medium in a system having a shock-proof function based on intermittent driving.

2. Related Background Art

Conventionally, an information recording apparatus using a disc-like recording medium (hereinafter, referred to simply as a disc) has been principally used as peripheral equipment of a personal computer or the like. Since the information recording apparatus is advantageous in portability of a medium or in rapid random access response, the information recording medium has been developed as high-capacity data storage equipment. In recent years, a small-diameter high-capacity disc has been employed for a high-definition still camera or video camera and the like with a rapid increase in the density of the disc and therefore has achieved a remarkable breakthrough as a principal medium for image pickup/recording equipment.

An image pickup/recording apparatus using the disc as a recording medium has a function called shock-proof against a hand jiggle, a vibration, an unexpected shock or the like during photographing/recording to increase a shock resistance for a recording/reproduction function.

As such a technology, for example, a technology described in Japanese Patent No. 3227756 can be cited. According to the technology described in Japanese Patent No. 3227756, recording signals are temporarily accumulated in a memory. Meanwhile, disc driving is stopped to wait for an access. The disc driving is an operation which consumes a large amount of electric power such as spindle motor driving for rotating a disc, thread motor driving for controlling the position of an optical pickup to a predetermined address location on the disc, actuator driving in charge of control of the position of an objective lens, and recording laser power driving (hereinafter, the functions of driving a disc are collectively referred to as "drive").

When a sufficient amount of recording signals is accumulated in the memory, the disc drive is started. Subsequently, recorded data is read out from the memory at a high speed to record the read data on the disc. Upon termination of the recording on the disc, the disc drive is stopped again. Since a transmission rate of recording the data on the disc is several times higher than that of the input recording signals, the shock-proof function as described above can be realized.

An operation of repeating the operation and the stop of the drive in predetermined cycles is called intermittent driving. The intermittent driving contributes not only to increase a shock resistance but also more to keep down power consumption for driving the drive as the time period for stopping the disc drive becomes longer. Therefore, the intermittent driving greatly contributes to power saving of the entire image pickup system. Moreover, since a drive stop period can be ensured, a return processing (hereinafter, referred to as retry) can be performed by using a standby time even if a servo error occurs due to a disturbance or the like on a casing. Therefore, the continuity and the reliability of a recording or reproducing operation can be increased.

In particular, the shock-proof function using a high-capacity memory has recently been realized with the increase in capacity and the reduction in price of a semiconductor memory. By setting a long intermittent stop period of the disc drive to stop a drive operation as long as possible, a remarkable power saving effect can be obtained to support long-time battery driving in portable equipment.

With the shock-proof function of the related art, a recording disc cannot be removed from equipment immediately after a user issues a recording end command. This is because an operation of recording recorded data accumulated in the memory on the disc is required after the user issues the recording end command to temporarily accumulate the recorded data in the memory. Therefore, as the amount of data accumulated in the memory becomes larger, a time required to record the data on the disc becomes correspondingly longer. To be specific, even if the user issues the recording end command, the user cannot remove the disc during information transfer from the memory to the disc and therefore is made to wait. In particular, for image pickup/recording of moving images with a video camera, it is important to ensure the continuity of a series of moving images. Therefore, a high speed is required to complete disc change within an extremely short period of time.

SUMMARY OF THE INVENTION

It is therefore an object of the present invention to provide a system capable of increasing a shock resistance by a shock-proof function and of removing a disc-like medium immediately after completion of recording on the disc-like medium.

According to the present invention, even when a shock-proof system using a high-capacity semiconductor memory is constructed, the present invention has the effect of enhancing disc removal readiness during recording. In addition, by taking full advantage of the high-capacity memory, the system according to the present invention has the effect of achieving a high vibration resistance and low power consumption as portable equipment.

Moreover, the present invention can provide a user with the function of intentionally and immediately removing the disc-like medium during image pickup/recording, which prevents the user from missing the opportunities of taking images without losing a rare chance to change a disc. Furthermore, since data existing in the memory can be saved on a disc after forced disc change, data loss caused by forced disc ejection can be avoided to keep the continuity in image pickup/recording. In the shock-proof system which takes full advantage of the high-capacity semiconductor memory as described above, user's advantage in accessibility to disc change can be realized.

To be specific, according to one aspect of the invention, an information recording apparatus includes:

a memory for storing image pickup data;

a recording circuit for intermittently recording the image pickup data stored in the memory on a disc-like medium from the memory;

a setting circuit for setting an ejection mode of the disc-like medium; and a control circuit for ejecting the disc-like medium without recording the image pickup data stored in the memory on the disc-like medium when a first ejection mode is set by the setting circuit.

BRIEF DESCRIPTION OF THE DRAWINGS

FIGS. 2A and 2B are views for explaining intermittent driving of the information recording apparatus according to the present invention;

FIG. 3 is a functional block diagram showing a system controller;

DESCRIPTION OF THE PREFERRED EMBODIMENTS

Figure 1:
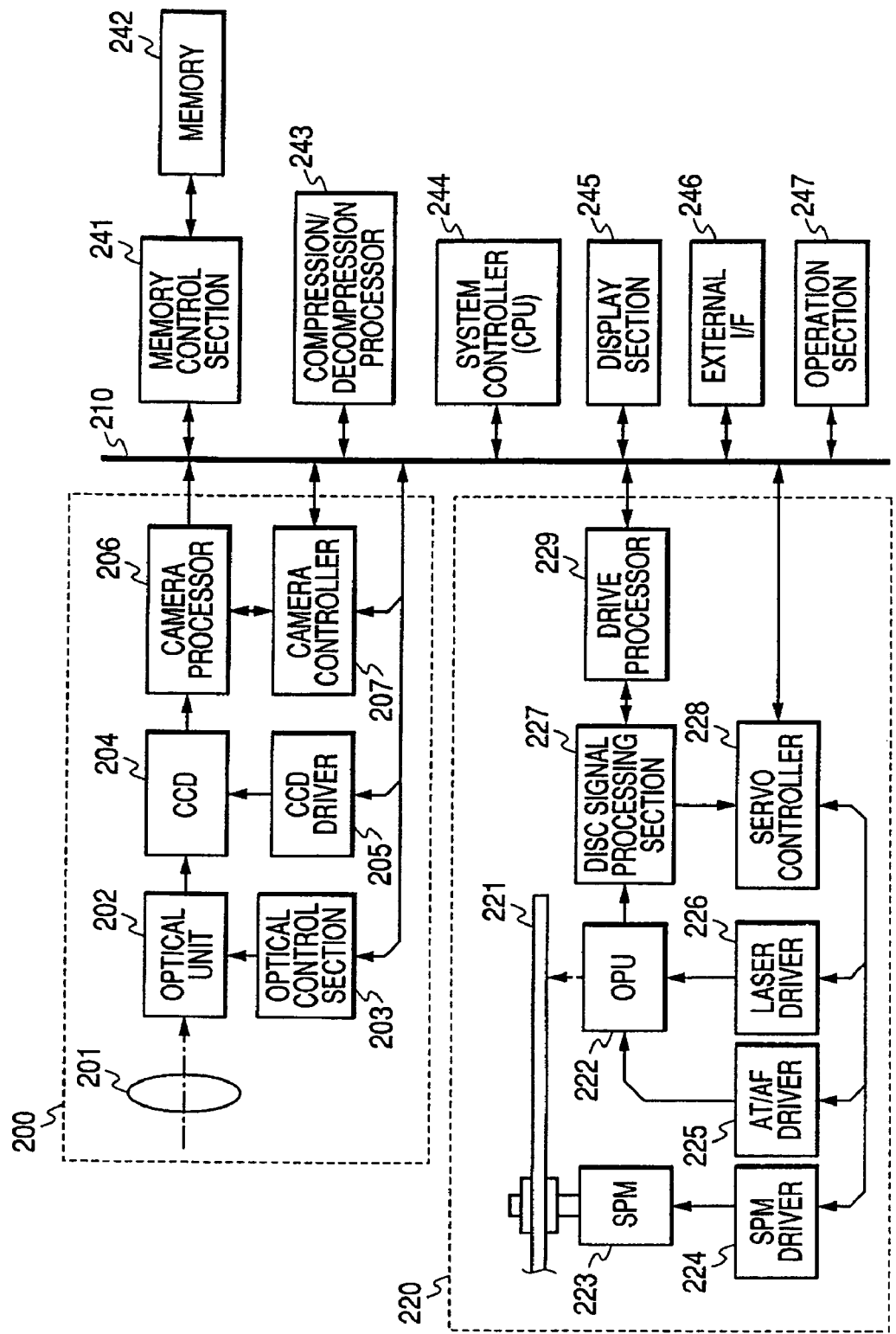
FIG. 1 is a block diagram showing an embodiment of an information recording apparatus according to the present invention.

Next, the best mode for carrying out the present invention will be described in detail with reference to the accompanying drawings. FIG. 1 is a block diagram showing a configuration in an embodiment of the present invention.

<The Entire Configuration and a Series of Operations in this Embodiment>

An information recording apparatus shown in FIG. 1 is a disc drive system having an image pickup function and mainly includes: an image pickup system 200; a disc drive system 220; and other components such as a memory and a control section. The image pickup system 200 includes: a front lens 201; an optical unit 202 having the functions such as zoom, focus, a diaphragm and vibration-proof; an optical control section 203 for controlling the optical unit 202; an image pickup element CCD 204; a CCD driver 205; a camera processor 206; and a camera controller 207.

The disc drive 220 includes: a spindle motor 223 for rotatably driving a disc 221 corresponding to an information recording medium; an optical pickup (OPU) 222 for irradiating a light beam on the disc 221 to record or reproduce information; an SPM driver 224 for driving the spindle motor 223; an Auto Tracking (AT)/Auto Focus (AF) driver 225; a laser driver 226 for driving a laser element in the optical pickup 222; a servo controller 228 for controlling a servo; a disc signal processing section 227; and a drive processor 229.

In addition to the above components, the information recording apparatus also includes: a memory 242; a memory control section 241; a compression/decompression processor 243; a display section 245; an external interface (hereinafter, referred to as the external I/F) 246; an operation section 247; and a system controller (CPU) 244. Reference numeral 210 denotes a data bus for connecting the components in the disc drive system to each other.

Next, a basic operation will be described. The system controller 244 includes a central processing unit (CPU) function to process a user-designated command from the operation section 247. Alternatively, the system controller 244 controls an image pickup operation or a servo operation on the disc 221 through the camera controller 207 or the servo controller 228. Furthermore, the system controller 244 executes a predetermined control program to control the overall system.

The external I/F 246 is an interface processing system for realizing a signal transmission/reception function in conformity with input/output of an analog video/audio signal, a high-speed digital IEEE 1394, a Universal Serial Bus (USB), or various standards such as those of wireless communication. The operation section 247 is a user interface which includes a group of a large number of switches necessary for an image pickup/recording operation such as an ejection (disc ejection) switch, a power ON/OFF switch, and a recording/reproduction switch. The display section 245 is an interface for monitoring an information recording apparatus operation status or a recorded video image, displaying various management information for a user, accepting a command instruction, and the like.

The memory 242 is a memory which is time-shared by the functional blocks via the data bus 210. Data write to and data read from the memory 242 are controlled from the system controller 244 via the memory control section 241.

Next, an operation of the image pickup system 200 will be described. First, a zoom angle of view or focus control desired by a user is performed through the optical system unit 202 composed of the fixed front lens 201, and a lens group and a diaphragm movable in a lens tube (not shown). A subject is imaged on the CCD 204 through the above-described optical system. The image formed on the CCD 204 is converted into a distribution of accumulated charges generated in a light-receiving portion. The accumulated charges are sequentially transferred in a vertical direction and a horizontal direction by the CCD driver 205 to generate image pickup electric signals in time-series.

The camera processor 206 performs a signal processing such as color separation, gradation correction, and white balance adjustment in accordance with a parameter set in the camera controller 207 to output the obtained signal as an image pickup signal to the data bus 210. The camera controller 207 collectively controls various operations of the optical control section 203, the CCD driver 205, and the camera processor 206 in accordance with a command of the system controller 244.

The obtained image pickup signal or the signal input through the external I/F 246 is subjected to a compression processing in conformity with a known encoding method such as Moving Picture Experts Group 2 (MPEG2) or H. 264 by the compression/decompression processor 243.

Next, an operation of the disc drive system 220 will be described. The optical pickup 222 is composed of an objective lens, an optical coupling group, a laser element, an actuator, a light-receiving element (all not shown), and the like. The optical pickup 222 performs an information recording or reproducing operation by laser beam radiation on the disc 221, positional control of a light beam spot, and the like.

The servo controller 228 performs the overall servo control of the drive system. The servo controller 228 controls driving of a traverse motor (not shown) to control the position of the optical pickup 222 in the vicinity of a predetermined address on the disc 221. The optical pickup 222 is provided with an actuator for driving the objective lens in a focus direction and a tracking direction. The AT/AF driver 225 controls the objective lens based on a focus error signal and a tracking error signal from the disc signal processing section 227. In this manner, a light beam spot is focused on a track of the rotating disc 221 while tracking control is performed to follow an information track. Furthermore, the servo controller 228 controls the rotation of the spindle motor 223 through the SPM driver 224.

The optical pickup 222 controls the amount of emitted laser light through the laser driver 226. Reflected light from the disc 221 subjected to servo control is photoelectrically converted in the light-receiving element in the optical pickup 222 to be transmitted as a sensor output signal. The disc signal processing section 227 performs a matrix operation on the sensor output signal from the optical pickup 222 to perform a series of signal processings such as gain control (Auto Gain Control), filtering (Pre Filter), and digitalization (Analog/Digital Converter).

The digitalized reproduced data is transmitted to the drive processor 229 on the downstream side. The drive processor 229 is in charge of a digital signal processing and generates a clock in synchronization with an edge of a reproduced signal in a Phase Locked Loop (PLL). Furthermore, the clock is subjected to waveform equalization by an equalizer, data detection in Partial-Response Maximum-Likelihood (PRML), a demodulation processing, Error Correction Code (ECC), and the like to be output to the data bus 210.

Subsequently, a data recording operation on the disc 221 will be described. The disc 221 is made of a recording phase-change material. When a light beam is irradiated on the disc 221 with a light beam intensity being modulated during the rotation of the disc 221, an amorphous state and a crystalline state change in a reversible fashion. In order to change a recording layer from the crystalline state to the amorphous state, a light beam is irradiated in a pulsed manner on the recording layer to melt the recording layer followed by quenching.

On the contrary, in order to change the recording layer from the amorphous state to the crystalline state, after being irradiated with a light beam at a relatively low intensity, the recording layer is annealed at a crystallizing temperature or higher. An optical change between the two states is used to record and reproduce information. The image pickup signal or the externally input signal is subjected to a modulation processing or data conversion in accordance with a disc recording format in the drive processor 229. The laser driver 226 is in charge of a known write strategy processing and controls the lighting of a laser in a pulsed manner in accordance with a recording modulation data pattern.

<Description of Drive Intermittent Driving Control>

Next, a flow of data recording in the memory 242 and on the disc 221 will be described in detail with reference to the drawings. FIG. 2A is a timing chart showing a time on an abscissa axis and the amount of data accumulated in the memory 242 on an ordinate axis. FIG. 2B shows an intermittent driving timing of the drive apparatus. The drive apparatus records data on the disc 221 in an intermittent operation while monitoring the amount of data accumulated in the memory. The drive apparatus drives the drive for an H period and stops the drive operation for an L period.

When a host command of starting photographing/recording is issued, image pickup signals are started to be accumulated in the memory 242 through a predetermined compression processing at a time t1. Reference symbol A indicated on the ordinate axis denotes a total capacitance value of the memory. The data is accumulated in the memory 242 at a predetermined transfer rate during the recording operation as shown in FIG. 2A. Next, at a time t2 at which the memory capacitance becomes M (the memory capacitance: M<A), the drive, which has been stopped, transits to a recordable state. Thereafter, data readout from the memory 242 is started to record the data on the disc 221.

A data recording rate from the memory 242 is several times higher than the accumulation rate. At a time t3, the data recording on the disc 221 is terminated. The drive transits to a stop operation. From the time t3 to a time t4, data readout from the memory 242 is in a standby state whereas only the data accumulation is continued. From the time t4 to a time t5, the data is read out from the memory 242 at a high speed to be recorded on the disc 221. From then on, the same operation is periodically performed.

As described above, the driving of the drive apparatus shown in FIG. 2B is such that the activation and the stop are controlled in accordance with the amount of data accumulated in the memory 242. Since power supply to a semiconductor laser for light emission and various motor driving systems which consume a large amount of electric power is stopped from the time t1 to the time t2 and from the time t3 to the time t4, such intermittent driving control greatly contributes to power saving.

Furthermore, even if a disturbance (a shock, a vibration and an oscillation) on the casing of the information recording apparatus occurs, the drive operation is not affected during the drive intermittent stop period. If a shock occurs during the drive operation to cause a servo error, the drive can retry (perform a return processing) during the intermittent stop period. The same intermittent operation described above in detail for recording the data on the disc 221 is also performed for reproducing the data from the disc 221.

<Functional Configuration of the System Controller in this Embodiment>

FIG. 3 is a functional block diagram of the system controller 244 characterizing this embodiment. The system controller 244 includes: an ejection mode judgment section 102; a recording operation control section 103; and an ejection processing section 104.

The ejection mode judgment section 102 is connected to the ejection switch 101 in the operation section 247. The system controller 244 performs communication with the operation section 247, the servo controller 228, the drive processor 229, the memory control section 241, and the like.

The ejection switch 101 is provided in the operation section 247. The ejection switch 101 serves to select an ejection mode of the disc 221 loaded into the information recording apparatus in response to a user command (user operation) from a normal ejection mode and a forced ejection mode. The ejection mode judgment section 102 judges the ejection mode in response to a user's instruction via the ejection switch 101.

Figure 4:
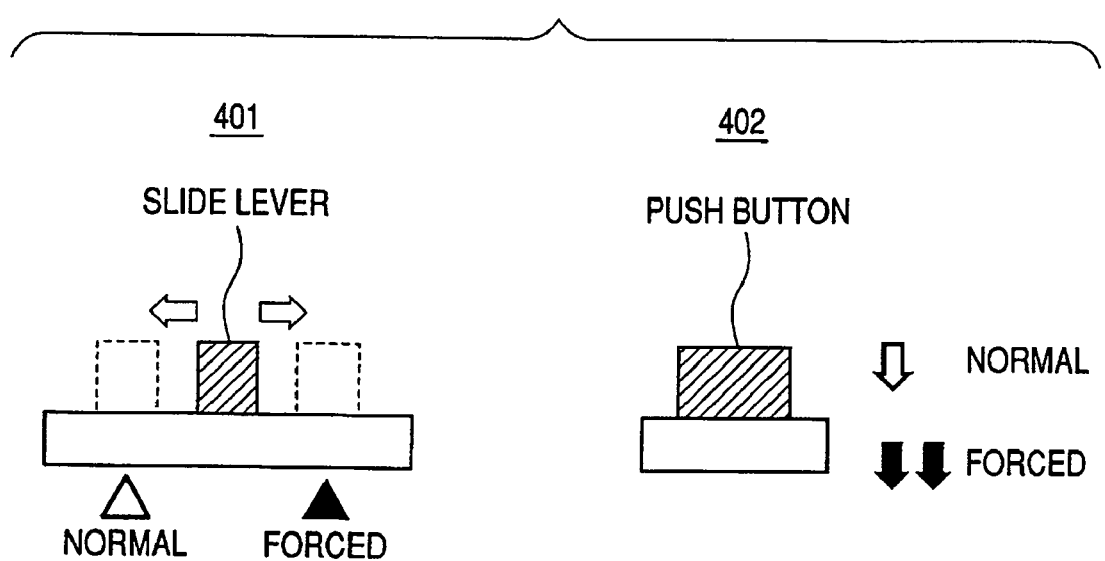
FIG. 4 is a view showing an example of an ejection switch.

FIG. 4 shows an exemplary configuration of the ejection switch 101. In FIG. 4, reference numeral 401 denotes the ejection switch consisting of a slide lever, which is viewed from a lateral direction. By sliding the ejection switch 401 from a center position to one side, the normal ejection mode is selected. By sliding the ejection switch 401 from the center position to the other side, the forced ejection mode is selected. Reference numeral 402 denotes a push switch realizing the same function. The normal ejection mode is selected by one push, whereas the forced ejection mode is selected by two pushes.

The ejection mode judgment section 102 judges the ejection mode in accordance with a user's action on the ejection switch 101. It is apparent from the gist of the present invention that the configuration of the ejection switch is not limited to those exemplarily shown in FIG. 4 as long as the ejection switch can realize the equivalent function.

The recording operation control section 103 controls a recording operation in accordance with the ejection mode to control the ejection processing section 104. The ejection processing section 104 controls the disc drive system 220. Upon instruction of the normal ejection mode, after recording the data accumulated in the memory 242 on the disc 221, the ejection processing section 104 ejects the disc 221. On the other hand, upon instruction of the forced ejection mode, the ejection processing section 104 immediately terminates the recording operation to eject the disc.

<Ejection Flow in this Embodiment>

Figure 5:
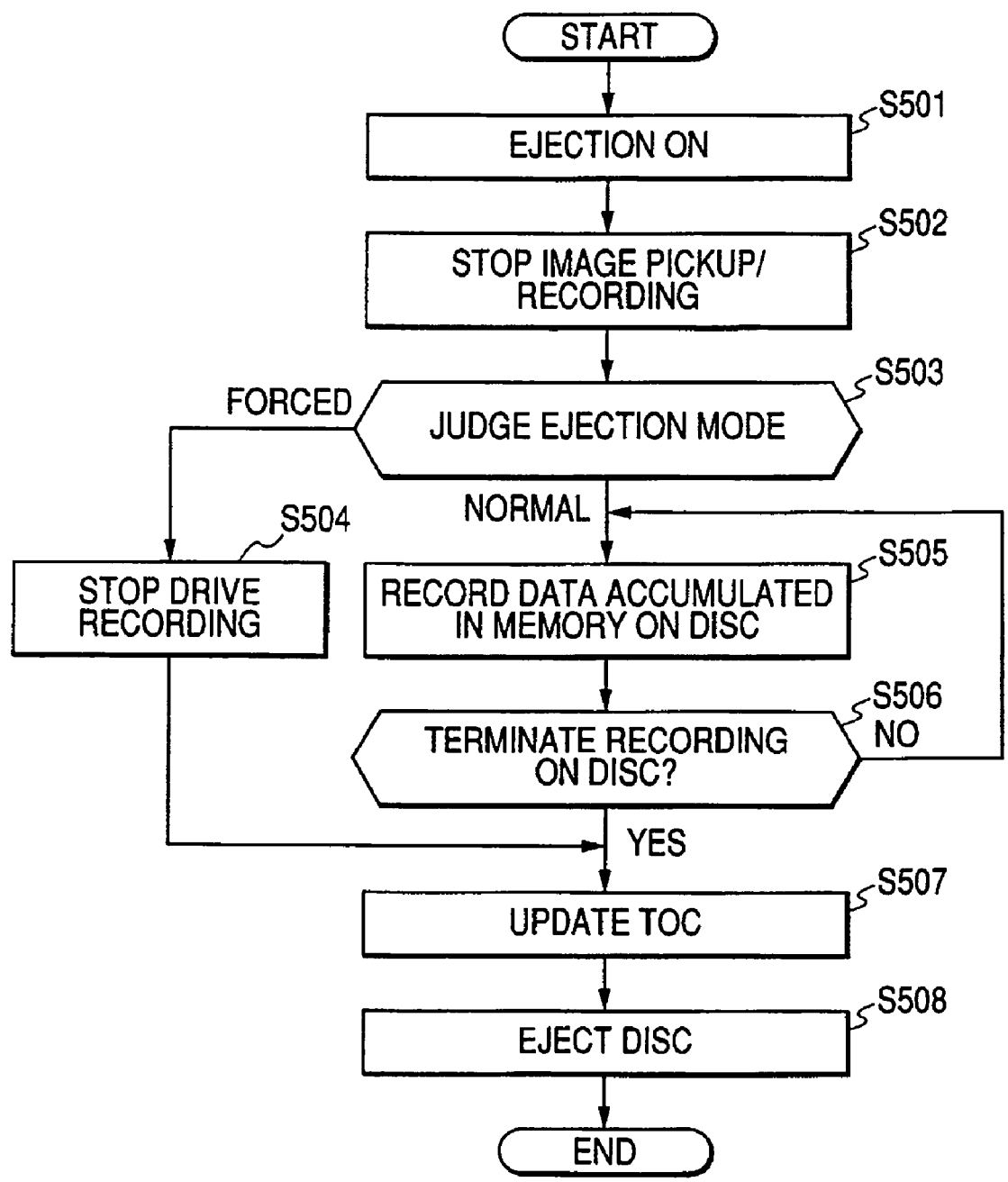
FIG. 5 is a flowchart for explaining an ejecting operation according to the present invention.

Next, with reference to FIG. 5, an ejecting operation flow according to this embodiment will be described in detail.

Step 501: Ejection ON

The information recording apparatus receives a user's ejection command by the operation of the ejection switch 101 in the operation section 247. The ejection command allows the execution of a processing even if the information recording apparatus according to this embodiment is recording data.

Step 502: Stop Image Pickup/Recording

Image pickup/recording is stopped. Specifically, the operations of the image pickup system 200 and the compression/decompression processor 243 are stopped to stop the data accumulation in the memory 242.

Step 503: Judge the Ejection Mode

The system controller 244 judges that the ejection mode is the normal ejection instruction or the forced ejection instruction based on the operation of the ejection switch 101. If the ejection mode is the normal ejection instruction, the process proceeds to Step 505. On the other hand, if the ejection mode is the forced ejection instruction, the process proceeds to Step 504.

Step 504: Stop Drive Recording

If the ejection mode is the forced ejection instruction, the system controller 244 immediately stops the recording on the disc 221. Specifically, even if image pickup data are accumulated in the memory 242, the image pickup data are not recorded on the disc 221.

Steps 505 and 506: Record Data Accumulated in the Memory on the Disc

If the ejection mode is the normal ejection instruction, the system controller 244 records the data accumulated in the memory 242 on the disc 221.

Step 507: Update a Table of Contents (TOC)

The system controller 244 updates a known TOC (disc management information, management information of a file system and the like) in accordance with the result of termination of recording on the disc 221.

Step 508: Disc Ejection

The disc drive system 220 ejects the disc 221 in the information recording apparatus in response to an instruction of the system controller 244.

The flow of the ejecting operation in this embodiment has been described above. Hereinafter, the relation between the ejecting operation and the data accumulation in the memory 242 in this embodiment will be additionally described with reference to FIG. 6.

Figure 6:
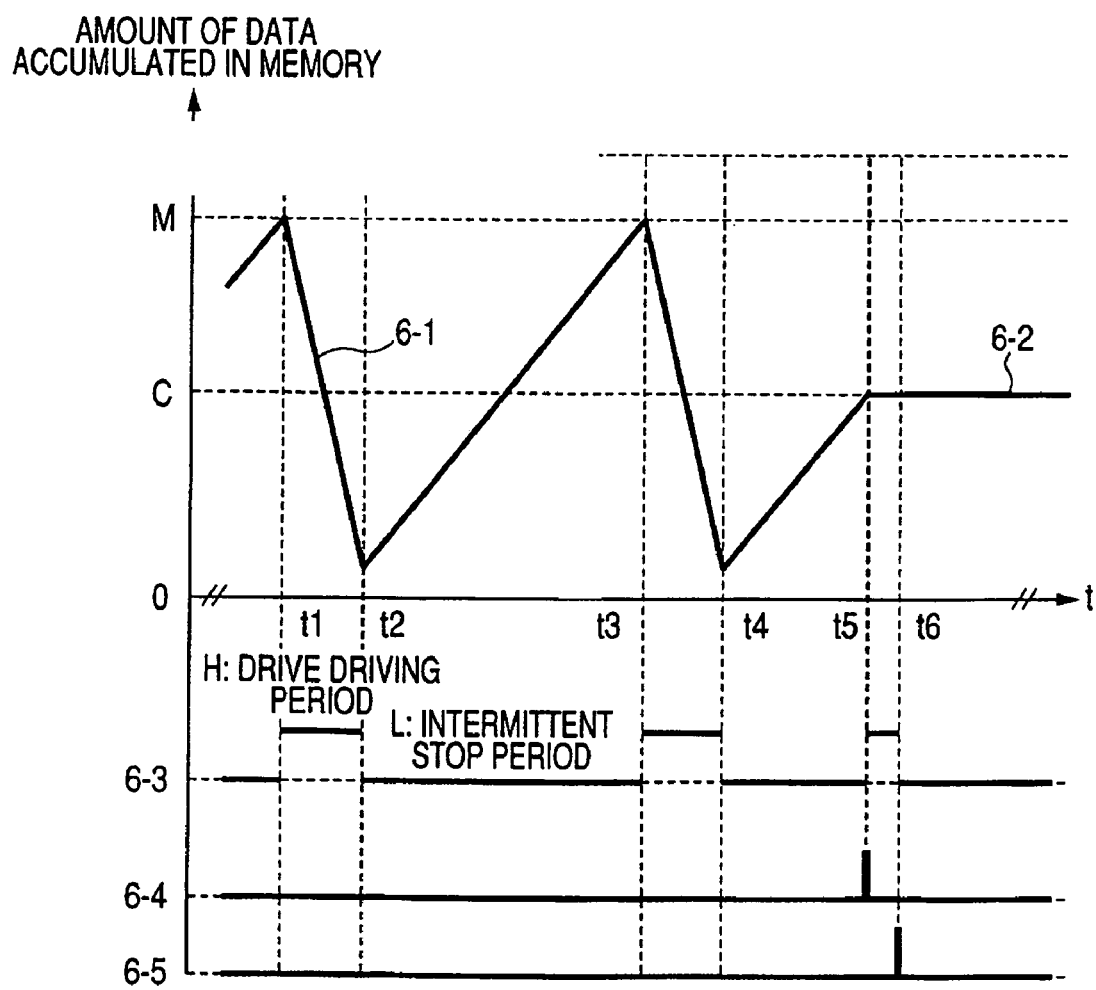
FIG. 6 is a timing chart for explaining a relation between the ejecting operation and data accumulation in a memory according to the present invention.

FIG. 6 is a timing chart showing a time on an abscissa axis and the amount of data accumulated in the memory 242 on an ordinate axis. Each of 6-1 and 6-2 shown in FIG. 6 represents a transition of the amount of data accumulated in the memory 242 with time. Reference numeral 6-3 shown in FIG. 6 denotes an intermittent driving timing of the drive apparatus. The drive apparatus records data on the disc 221 in an intermittent operation while monitoring the amount of data accumulated in the memory 242. The drive is driven for an H period, whereas the drive is stopped for an L period. Reference numeral 6-4 shown in FIG. 6 denotes an ejection signal. The ejection signal 6-4 becomes H (ejection) at a time t5 to perform the ejecting operation.

During the image pickup/recording operation, the data accumulation in the memory 242 transits as indicated by 6-1 and 6-2. From the time t1 to the time t2 and from the time t3 to the time t4, the disc drive operates to record the data in the memory 242 on the disc 221 at a high speed. From the time t2 to the time t3, the disc drive stops operating. As a result, the recording signals are accumulated in the memory 242 at a predetermined encoding rate.

Now, it is assumed that the operation section 247 receives the forced ejection instruction from the user at the time t5. The system controller 244 stops the operations of the image pickup system and the compression/decompression processor 243 to stop the data accumulation in the memory 242 (Step 502 in FIG. 5). Specifically, as shown in FIG. 6 (6-2), after the time t5, the amount of data accumulated in the memory is kept to a value C. Subsequently, after receiving the ejection instruction at the time t5, the system controller 244 starts the disc drive. Then, the system controller 244 records a file system for managing a file of the disc management information or the recorded data at a predetermined location of the disc (Step 507). At a time t6, the disc drive completes the recording of the management information and the like to eject the disc 211 out of the information recording apparatus.

<Operation Flow after Forced Ejection of the Disc According to this Embodiment>

The information recording apparatus adds value to the disc ejection in accordance with the needs of the user. After the disc is changed even on a rare occasion without fail by the forced ejection mode described above, the data accumulated and stored in the memory 242 can be recorded on another disc after disc change.

Figure 7:
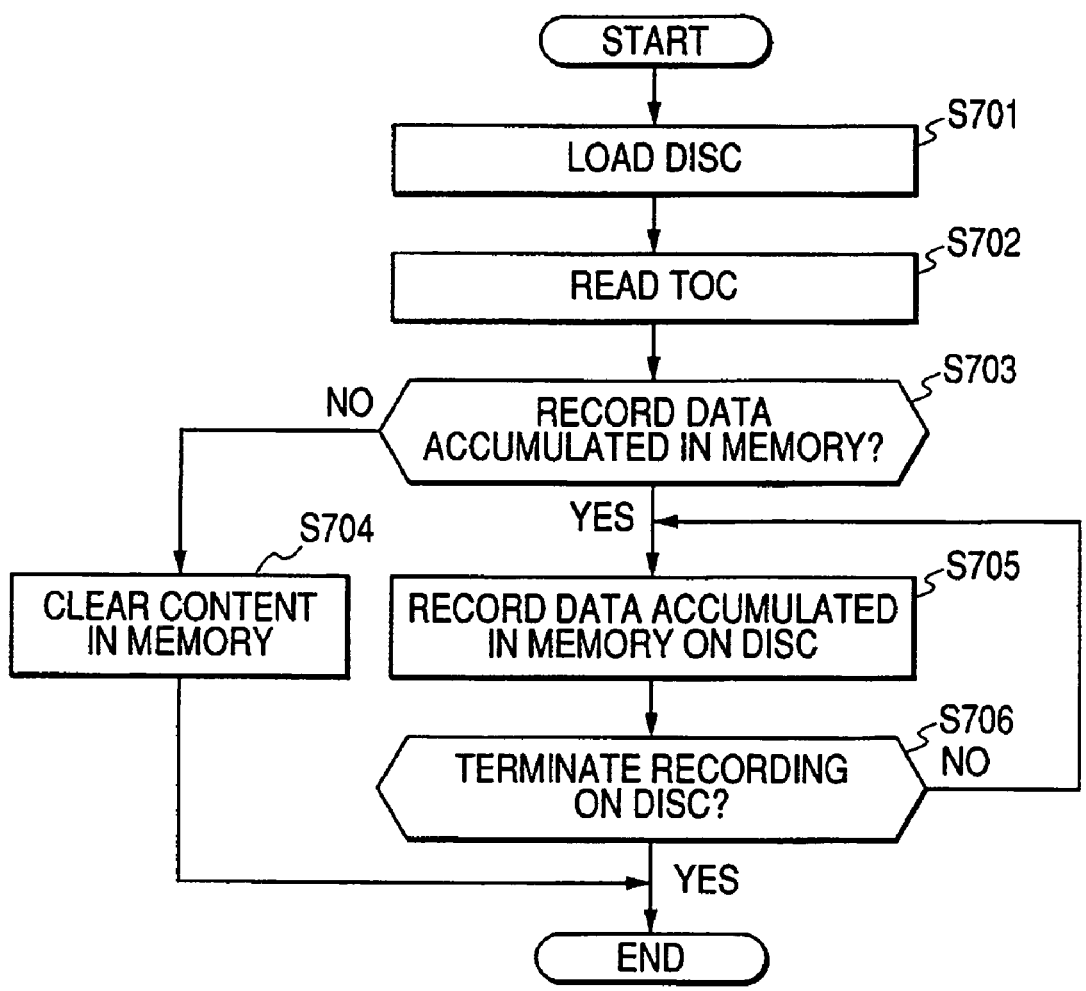
FIG. 7 is a flowchart for explaining an operation after forced ejection according to the present invention.

Next, an operation flow after the forced ejection will be described in detail with reference to FIG. 7.

Step 701: Disc Loading

The information recording apparatus accepts the insertion of the disc.

Step 702: TOC Reading

The system controller 244 reads the TOC of the loaded disc. If the disc is recordable, the system controller 244 gets into a recording standby state.

Step 703: Record the Data Accumulated in the Memory?

The system controller 244 has the function of inviting the user to select whether or not to record the recorded data remaining in the memory 242 on the disc after disc change on the display section 245 when the disc is loaded after the forced ejection. The user instructs to or not to record the data remaining in the memory 242 by the operation of the operation section 247. If the user records the data remaining in the memory on the disc, the process proceeds to Step 705. If the user does not record the data remaining in the memory on the disc, the process proceeds to Step 704.

Step 704: Clear the Content in the Memory

If the user does not record the data remaining in the memory on the disc, the system controller 244 clears the data existing in the memory 242. Alternatively, the system controller 244 performs an overwrite process in accordance with a post-processing.

Steps 705 and 706: Record the Data Accumulated in the Memory on the Disc If the user records the data remaining in the memory on the disc, the system controller 244 records the data accumulated in the memory 242 on the disc.

Figure 8:
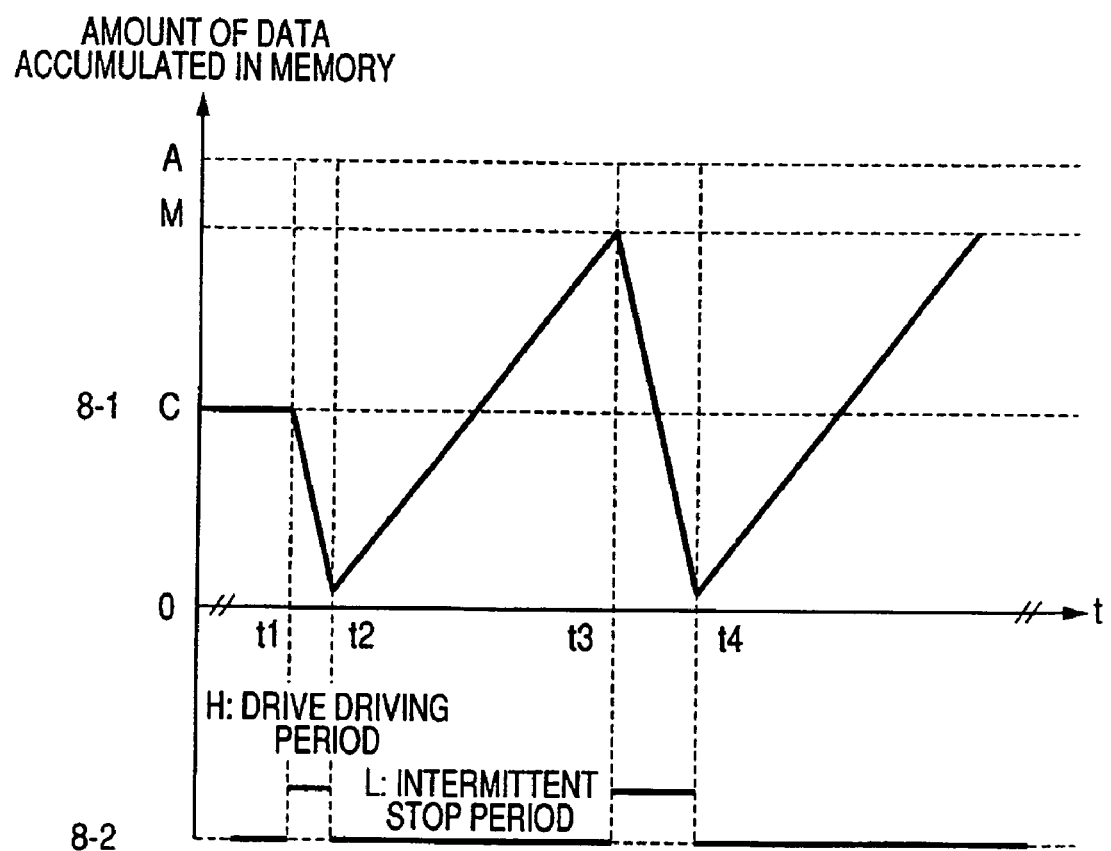
FIG. 8 is a timing chart for explaining data accumulation in the memory after disc change.

The operation flow after the disc change with the forced ejection in this embodiment has been described above. With reference to FIG. 8, the additional description will be given for the data accumulation in the memory 242 after the disc change.

FIG. 8 is a timing chart showing a time on the abscissa axis and the amount of data accumulated in the memory 242 on the ordinate axis. Reference numeral 8-1 shown in FIG. 8 denotes a transition of the amount of data accumulated in the memory 242 with time. Reference numeral 8-2 in FIG. 8 denotes an intermittent driving timing of the drive apparatus. The drive apparatus records data on the disc 221 in an intermittent operation while monitoring the amount of data accumulated in the memory 242. The drive is driven for an H period, whereas the drive is stopped for an L period.

When the disc is changed after the forced ejection, the amount of data accumulated in the memory 242 is kept to the data amount C as indicated by 8-1. Now, it is assumed that the user instructs to record the recorded data in the memory on the disc after the disc change at the time t1. The system controller 244 starts the disc drive at the time t1 to record the data in the memory on the disc after change.

Thereafter, as shown in the timing chart of FIG. 8, the user starts image pickup/recording immediately after the disc change. Therefore, from the time t1 to the time t2 and from the time t3 to the time t4, the disc drive is operated to record the data in the memory on the disc at a high speed. From the time t2 to the time t3, the disc drive stops operating. During this period, the recording signals are accumulated in the memory at a predetermined encoding rate.

This application claims priority from Japanese Patent Application No. 2005-126474 filed Apr. 25, 2005, which is hereby incorporated by reference herein.

What is claimed is:

1. An information recording apparatus, comprising:
a memory for storing image pickup data;
a recording circuit for intermittently recording on a disc-like medium the image pickup data stored in the memory;
a setting circuit for setting an ejection mode of the disc-like medium; and
a control circuit for ejecting the disc-like medium without recording the image pickup data stored in the memory on the disc-like medium when a first ejection mode is set by the setting circuit;
wherein the setting circuit has a second ejection mode; and the control circuit ejects the disc-like medium after the image pickup data stored in the memory is recorded on the disc-like medium when the second ejection mode is set by the setting circuit.

2. The information recording apparatus according to claim 1, wherein the setting circuit includes a switch; and an operation of the switch is changed to select one of the first ejection mode and the second ejection mode.

* * * * *